Sept. 27, 1955 E. P. PERTICS ET AL 2,718,836
LATERALLY SHIFTABLE TRACTOR-MOUNTED
CULTIVATOR WITH FLUID DRIVE
Filed May 10, 1951 3 Sheets-Sheet 1

INVENTOR.
ELIAS P. PERTICS AND
EMIL E. PERTICS.
BY Oltsch & Knoblock
ATTORNEYS

Sept. 27, 1955 E. P. PERTICS ET AL 2,718,836
LATERALLY SHIFTABLE TRACTOR-MOUNTED
CULTIVATOR WITH FLUID DRIVE
Filed May 10, 1951 3 Sheets-Sheet 2
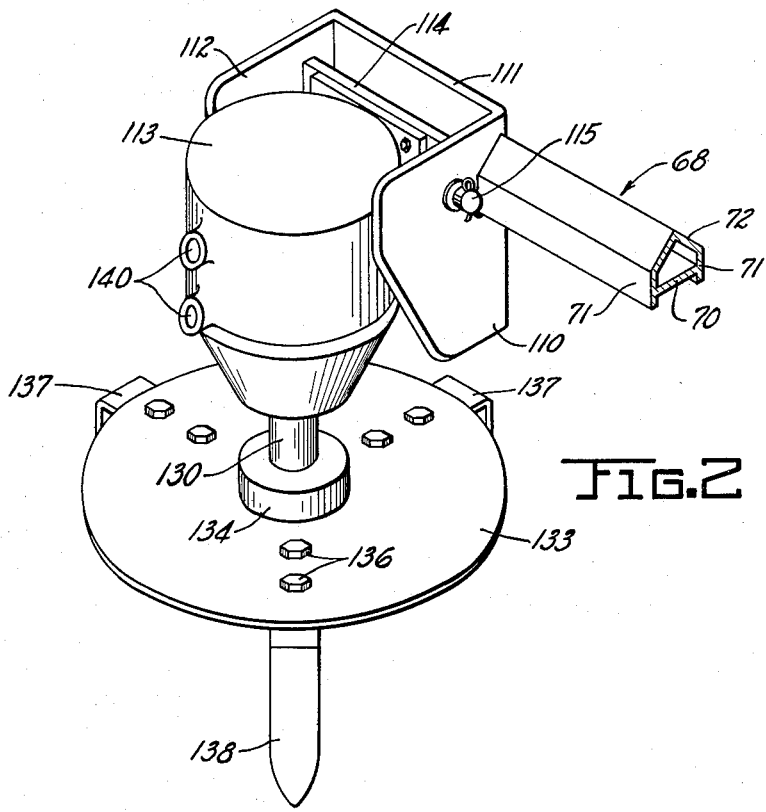
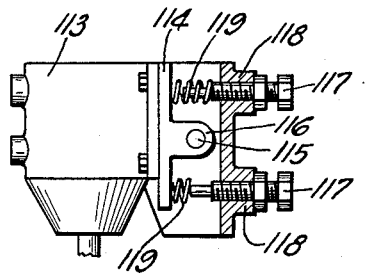
ELIAS P. PERTICS AND
EMIL E. PERTICS,
INVENTOR.
BY Oltsch + Knoblock
ATTORNEYS

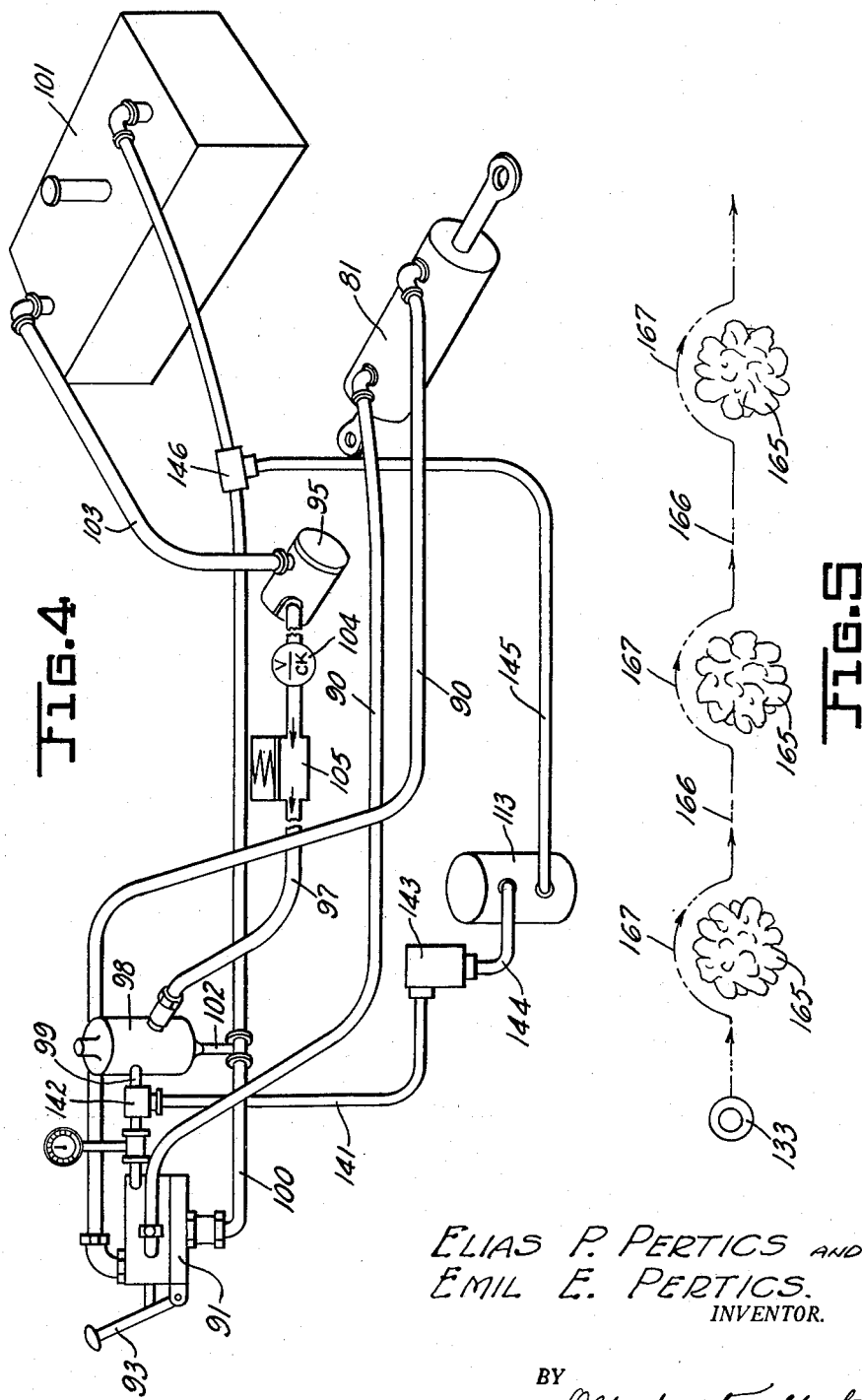

United States Patent Office 2,718,836
Patented Sept. 27, 1955

2,718,836

LATERALLY SHIFTABLE TRACTOR-MOUNTED CULTIVATOR WITH FLUID DRIVE

Elias P. Pertics and Emil E. Pertics, North Township, Marshall County, Ind.

Application May 10, 1951, Serial No. 225,552

3 Claims. (Cl. 97—43)

This invention relates to a laterally shiftable tractor-mounted cultivator with fluid drive, and particularly to a cultivator by means of which the soil may be cultivated around and between plants positioned in rows. Cultivators of this type are illustrated in our copending patent applications, Ser. No. 174,214, filed July 17, 1950, now Patent No. 2,694,355, and Ser. No. 193,576, filed November 2, 1950.

A primary object is to provide a cultivator having an earth-working head rotating about an upright axis and driven by a fluid pressure motor, which is mounted upon a tractive vehicle in a manner for selective adjusted lateral position with reference to the vehicle, for selective adjusted vertical position to control ground penetration, and for selective positioning tilted relative to the vertical to control its working attitude.

Other objects will be apparent from the following specification.

In the drawing:

Fig. 2 is a perspective view of the ground-working tool element.

Fig. 3 is a fragmentary side view of the ground-working tool, with the mounting bracket therefor shown in section.

Fig. 4 is a perspective view illustrating the hydraulic system of the device; and Fig. 5 is a schematic view illustrating the manner in which the device is used.

Figure 1:
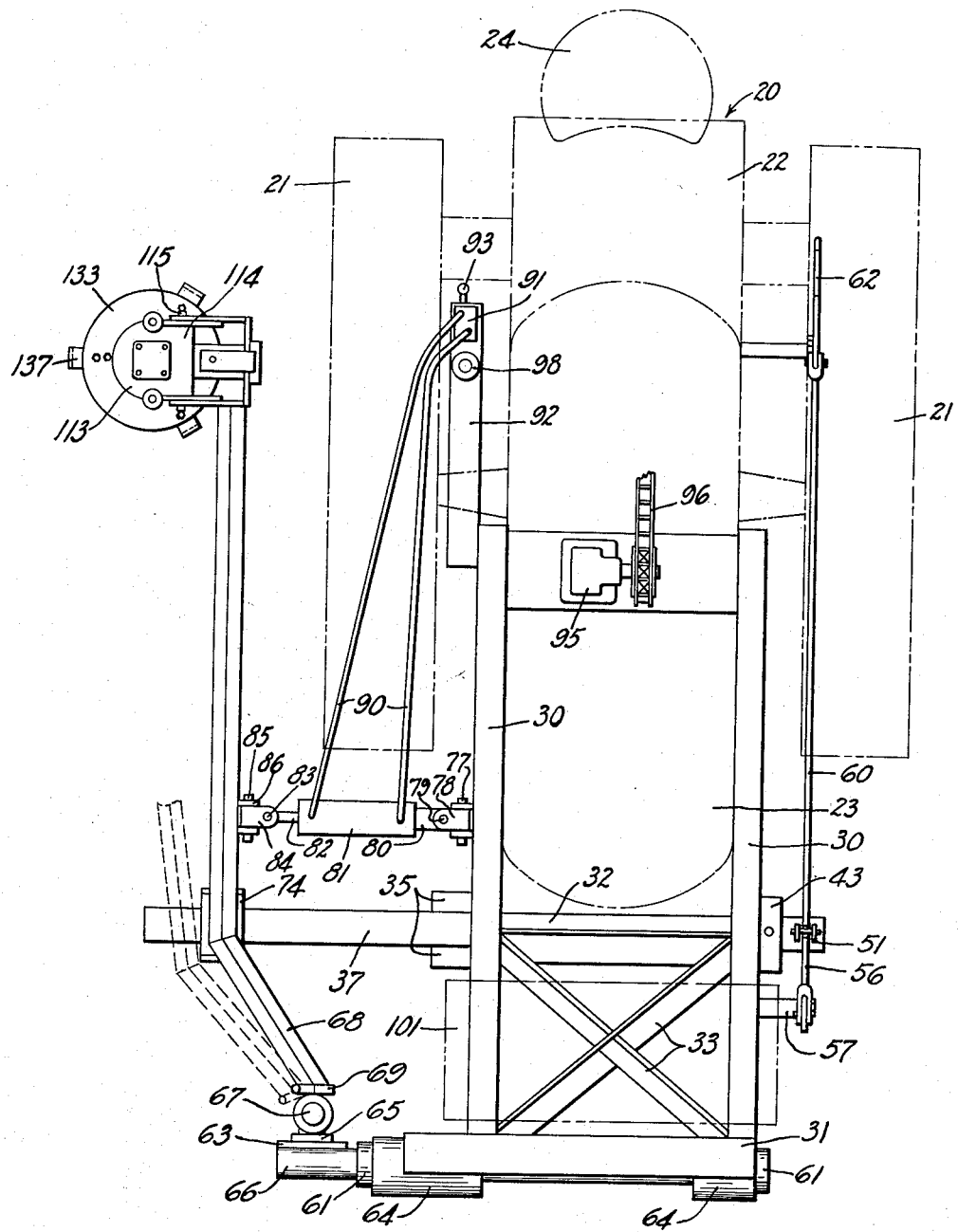
Fig. 1 is a top plan view of the device mounted upon a tractor illustrated in dotted lines.

The drawings illustrate one embodiment of the invention of the type shown in our co-pending application, Ser. No. 174,214, filed July 17, 1950, now Patent No. 2,694,355. Referring to the drawings, the numeral 20 designates a tractor, here shown as of the crawler type traveling on endless track members 21 and having the usual frame 22 and engine 23. My cultivating device may be mounted upon the tractor 20 or upon any wheeled or mobile vehicle by means of a rigid frame which may include the longitudinal frame members 30 secured to or forming part of the vehicle and located at opposite sides thereof and, as here shown, projecting forwardly beyond the tractor. The frame members 30 may be secured to the vehicle in any suitable manner. The frame members 30 have welded or otherwise rigidly secured thereto at their forward end a transverse rigid frame member 31, here illustrated as a channel member. One or more additional transverse frame members, such as the member 32, may connect the forwardly projecting portions of the frame members 30 and, if desired, additional members, such as the diagonally positioned intersecting angle irons 33, may also interconnect the longitudinal frame members 30 between the members 31 and 32 to further rigidify the forwardly projecting frame.

One of the frame members 30, here illustrated as the left-hand frame member in Fig. 1, has secured thereto in depending relation, as by welding or other securing means, a bracket 35. An elongated rigid member 37 is mounted by the bracket 35 adjustably on and extends transversely of the frame. A vertical guide, including the member 43, is fixedly secured to a frame member 30, and assists in positioning the member 37.

A bellcrank lever 56 is pivoted upon stud shaft 57 projecting laterally outward from the frame member 30 adjacent to guide 43, preferably forwardly of the cross channel 37. An arm of the bellcrank lever is pivoted to a member 51 carried by the member 51, and another arm of the lever preferably extends upwardly and has pivotally connected thereto one end of an elongated link or rod 60. The other end of the rod 60 is pivotally connected to a hand lever 62 preferably carried by the vehicle frame 22 rearwardly of the cross channel 37 and preferably within reach of an operator sitting upon the seat 24. Ratchet means (not shown) are mounted upon the lever 62 and adapted to hold the lever 62 and its associated parts in selected position. The parts are so arranged that, as the lever 62 is shifted from one position to another, the bellcrank lever is swung to raise or lower its pivot connection with the part 51. As these parts are raised or lowered, the end of the cross channel 37 connected thereto is similarly raised or lowered. Coil springs (not shown) provide yielding connections between the parts for purposes to be mentioned hereinafter.

Bearing members 64 are fixedly secured to the front frame cross member 31 as by welding thereof, said bearings preferably comprising sleeves which rotatably receive collars 61 carried by a cross shaft 66. The cross shaft 66 projects from one side of the frame, here shown as the left side in Fig. 1, and is adapted to rotate about its longitudinal axis, i. e. about an axis transverse of the longitudinal frame members 30 of the device. A vertically elongated rigid plate 63 is welded or otherwise fixedly secured to the laterally projecting end of the shaft 66. A pair of vertically spaced axially aligned bearing members are anchored to the plate 63 as by means of plate 65 welded or otherwise connected to the plate 63. Another bearing member is associated with the first named bearings in axial alignment therewith, and a pin or shaft 67 extends axially through said bearings and preferably holds the parts in assembled relation. The second bearing is mounted upon the front end of an elongated rigid arm 68 as by means of a cross plate 69 welded or otherwise secured to the bearing and in turn fixedly secured to the arm 68. The arm 68 constitutes a carrier member for a tool unit and must be strong and rigid and adapted to withstand both bending and twisting forces. Any construction of arm which will satisfy these conditions may be employed. For purposes of illustration, the arm has been shown in Fig. 2 as having a beam of H-shape including a central web 70 and perpendicular flanges 71 to which are welded along their length the opposite marginal portions of an angle iron 72. The resultant member is of a cross-section somewhat resembling the letter A, as seen in Fig. 2, and possesses great strength and resistance to bending and to twisting.

The arm 68 has brackets welded or otherwise fixedly secured thereto spaced from the shaft 67, and these brackets mount anti-friction means, such as a roller 74. The roller 74 is of a length greater than the width of the member 37 and is so positioned along the length of the arm 68 as to bear upon the member 37 and to run thereon as a lateral guide.

In rearwardly spaced relation to the bracket 35 the left-hand longitudinal frame member 30 viewed in Fig. 1 has secured thereto a yoke or bracket to which is pivoted upon a pin 77 substantially parallel to the frame member 30 a clevis 78, in turn having pivotally connected thereto at 79 a projecting ear 80 mounted upon the end of a cylinder 81. The cylinder 81 is preferably of the type having a double-acting piston (not shown) provided with a piston rod 82 projecting from the opposite end of the cylinder adapted for pivotal connection at 83 with a clevis 84. The clevis 84 is pivoted by means of a pin or shaft 85 to a clevis or bracket 86 which is fixedly secured to the arm 68 rearwardly of the roller 74.

Conduits 90 connect the opposite ends of the cylinder 81 to a control valve 91 which is mounted upon a support 92 which may be carried by the frame 30, preferably at the side thereof opposite that at which the lever 62 is positioned. The valve 91 will be mounted within convenient reach of an operator sitting upon the vehicle seat 24 and will be provided with a hand lever 93 to facilitate manipulation of the valve.

The cylinder 81 and valve 91 constitute parts of a hydraulic system which is of the high pressure, high volume type. This system is best illustrated in Fig. 4. A high pressure, high volume pump 95 is connected with a power member, such as the engine of a tractor, to be driven thereby, as by means of a chain and sprocket drive 96. A line 97 connects the pump 95 to a relief valve 98. Line 97 preferably has interposed therein a check valve 104 and a mechanical pressure accumulator 105 of any construction found suitable. A line 99 connects the valve 98 to the control valve 91. A return line 100 leads from control valve 91 to an oil supply tank 101 which preferably is mounted upon the front portion of the frame forwardly of the vehicle, as illustrated in Fig. 1. This arrangement of the parts enables the use of a liquid supply tank of large capacity so as to provide a sufficient capacity for the requirements of the device. A line 102 connects the relief valve 98 with the return line 100. A suction line 103 connects the tank 101 with the intake of the pump 95. The parts are so proportioned that the operating pressure of liquid in the system and the quantity of liquid in the system both are high to provide an instantaneous operating response at the cylinder unit 81 when the valve handle 93 is operated.

The arm 68 projects rearwardly from the shaft 66 to a position slightly forwardly of the driver's seat 24 upon the vehicle so as to be in full view of the operator mounted upon the seat. The arm fixedly mounts a yoke or bracket at its rear or free end, which yoke includes a plate 110 positioned substantially perpendicular to the arm 68, a longitudinally outwardly projecting plate 111 and a second cross plate 112 spaced from and substantially parallel to the plate 110. Each of the plates 110, 111 and 112 will be substantially upright. The yoke defined by the parts 110, 111 and 112 receives the housing 113 of a fluid pressure or hydraulic motor of any suitable type. Motor housing 113 is secured fixedly to a carrier plate 114, usually positioned upright and mounting a bearing 116 which may be journaled on a shaft 115 carried by or journaled to plates 110—112 substantially parallel to the arm 68 and spaced from part 111. The lateral spacing of the shaft 115, which defines a pivot axis, from the axis of housing 113 serves to provide an unbalanced mounting of the housing 113. Positioning means are utilized to control the attitude or tilt of the gear head, and these positioning means include at least one pair of set screws 117 threaded in bosses 118 carried by part 111 above and below the level of the shaft 115. The set screws 117 have reduced end parts, and a coil spring 119 encircles the reduced end part of each of the set screws 117 and each bears at its inner end upon the plate 114 which mounts the motor housing 113. By adjusting the positions of the set screws 117, the angular or tilted position of the motor housing 113 may be controlled at will within a predetermined range, and at the same time, resilience of the mounting is provided by the springs 119.

A motor shaft 130 is journaled in the motor housing 113. The shaft 130 projects below the housing 113 and mounts a tool unit which preferably includes a fixedly secured concentric plate 133. As here shown the plate 133 has a collar 134 which serves to connect the plate and the shaft. The plate has fixed thereto, as by means of bolts 136, the horizontal shank portions 137 of rigid depending tooth members 138 which constitute the ground-penetrating and working members. The members 138 will preferably be formed of heavy gauge spring steel plate comparable to the metal employed in the manufacture of automobile leaf springs. The members 138 will be arranged in spaced and equiangular relation upon the plate 133 with reference to that plate and to the shaft 130.

The fluid pressure motor is adapted for connection in the hydraulic system illustrated in Fig. 4, and the housing 113 of the motor has inlet and outlet ports 140 at which fluid pressure conduits may be connected. A high pressure line 141 branches from the line 99 at the connector 142 and leads to a volume control valve 143. A pressure inlet line 144 extends from the volume control valve 143 to the inlet of the fluid motor. A line 145 connects the outlet of the fluid motor 113 with the return line 100 at a fitting 146.

This device is particularly well suited and intended for movement along a path of travel as illustrated diagrammatically in Fig. 5 where the numeral 165 designates plants which are positioned in a row and spaced apart a substantial distance from one another. The rotary tool unit 133 is adapted to move between the plants along the straight runs 166 effectively cultivating a path of substantial width, including the area directly between the plants 165. The path of movement of the cultivating head 133 is offset at 167 around each plant as shown. It will be apparent, therefore, that when the device has traversed along a given row at both sides, a complete cultivating action between the plants in the row and around each individual plant will occur. By practice it has been found that with this device substantially all weeds around a plant can either be removed or can be covered with loose earth or mulch so as to be stunted in growth because of lack of air and sunlight. This operation is performed with the mechanism described by causing the device to travel alongside the row of plants to be cultivated, with its head 133 rotating and with its mount shifted in and out as required to permit the head to swing around and clear of the plants at the portions 167 of the path of movement shown in Fig. 5.

The lateral movement of the cultivator or tiller head 133 is controlled by the valve 91. This valve will normally be positioned so that the flow of oil or other liquid in the system will occur in the following circuit: From tank 101 through suction line 103 to pump 95, thence through high pressure line 97, relief valve 98, conduit 99, to control valve 91, and from control valve 91 through return line 100 to tank 101.

When the position of the valve 91 is changed by operating the lever 93, fluid in the system is diverted by the valve 91 from supply conduit 99 to one of the two conduits 90 and thence to the cylinder 81. At the same time the valve opens communication between the other conduit 90 and the return line 100 so that as the liquid under pressure enters one end of the cylinder 81, the liquid at the opposite end of that double-acting cylinder-piston unit may be discharged. By having a system of sufficiently high pressure and high volume, it is possible to secure substantially instantaneous response of the cylinder-piston unit 81 and to secure sufficient power so that the arm 68 may be moved laterally while the tractor is traveling forwardly, so that the tiller head 133 will follow the path indicated by the lines 166, 167.

The horizontal pivotal movement of the arm 68 occurs around the shaft or stud 67 as a center and is substantially devoid of friction by virtue of the fact that the weight of the arm at its intermediate portion is borne by the roller 74 which travels upon the member 37 acting as a guide.

The arm 68 is thus, in effect, a lever anchored to the tractor at its forward end and fulcrumed at its intermediate part so that its longitudinal tilt or attitude will depend upon the elevation of the part of the member 37 which roller 74 engages. This longitudinal attitude can be varied by manipulating the hand lever 62 to alter the position of the member 37, that is, to longitudinally tilt the member 37 with respect to its intermediate fulcrum, namely, the mounting bracket 35. It will be evident that the manipulation of the lever 62 will determine the vertical position of the tiller head between a position of maximum working depth and a position in which it is above and clear of the surface of the ground. Variations in the vertical position of the arm 68 and the member 37 are accommodated by rotation of the shaft 66 relative to the bearings 64 by which it is journaled to the frame 30, 31 of the cultivator. It will also be evident that the device can be operated for the purpose of moving the arm in and out, as between the full line and the dotted line positions illustrated in Fig. 1, regardless of the longitudinal attitude or tilt of the arm 68, by virtue of the connections of the actuating cylinder and piston unit with the frame 30 and with the arm 68, respectively, said connections constituting substantially universal joints.

The tiller head can be power driven in all operative positions of the arm 68 and also at times when the tiller head 133 is elevated above and clear of the surface of the ground. In this connection attention is directed to the fact that the conduits 144 and 145 will be flexible, either in whole or in part, to accommodate the various possible adjustments of the cultivator head and its mount.

The ability to tilt the working head to control its lateral position and to control its depth render the device susceptible or adaptable to usage under all working conditions. Note that the shaft 115 forming the tilt axis of the head is positioned substantially parallel to the direction of travel of the vehicle. This reduces the stresses acting upon the adjusting parts 117—119. The tilt adjustment of the rotating tiller head is of considerable importance in certain features of use. It is particularly important from the standpoint that it assists in throwing or displacing the dirt loosened by the tiller in a manner so as to build a ridge or hill, that is, in a manner to hill up around the plants 165. Thus, as viewed in Fig. 5, if the tiller head is rotating counter-clockwise and is so oriented that its operating shaft is tilted downwardly and inwardly with respect to the plant, then the operation of the tiller will be such that it tends to throw earth toward the plant and thus to build a hill around the plant and to build a ridge between the plants at the runs 166.

The tiller head operates under the control of valve 143, which will be located within reach of an operator sitting on the seat 24. When the valve 143 is open, liquid under pressure passing through line 99 will enter line 141, pass through valve 143, line 144, motor 113 and return line 145 for return to tank 101 through line 100. The use of the accumulator 105 serves to maintain at a minimum the size of the tank 101 and yet provide adequate capacity to operate both the cylinder-piston unit 81 and the motor 113.

The device is not limited in its application and use to a toothed tiller head as shown. Any other type of ground-working tool may be used as desired. For example, a rotary brush may be carried by the free end of arm 68. Such a brush is particularly well suited in fields in which small fruit is grown on bushy plants, such as blueberries and raspberries. The brush may be used to sweep away the fruit which falls to the ground beneath the bushes. The brush can also be used to remove small weeds without materially disturbing the soil.

While the drawings illustrate the preferred embodiment of the invention, it will be understood that they are intended to be illustrative and not limiting, and that all other constructions within the scope of the appended claims are contemplated to lie within the spirit of the invention.

We claim:

1. A cultivator adapted to be mounted on a vehicle, comprising a support adapted to be shiftably carried by a vehicle, a pair of rigid yoke-defining parts carried by said support and spaced apart in the direction in which said support is propelled by said vehicle, a pivot member carried by said yoke parts and extending substantially parallel to the direction of travel of said support, a motor having an upright axis of rotation, a cultivator head depending from and driven by said motor, a bracket carried by said motor and connected to said pivot member to pivot said motor eccentrically of its axis, and adjustment members carried by said support and engaging said bracket to position said motor in selected tilted position.

2. A cultivator adapted to be mounted on a vehicle, comprising a support adapted to be shiftably carried by a vehicle, a pair of rigid yoke-defining parts carried by said support and spaced apart in the direction in which said support is propelled by said vehicle, a pivot member carried by said yoke parts and extending substantially parallel to the direction of travel of said support, a motor having an upright axis of rotation, a cultivator head depending from and driven by said motor, a bracket carried by said motor and connected to said pivot member to pivot said motor eccentrically of its axis, and a pair of set screws carried by said support and engaging said bracket respectively above and below said pivot member.

3. A cultivator adapted to be mounted on a vehicle, comprising a support adapted to be shiftably carried by a vehicle, a pair of rigid yoke-defining parts carried by said support and spaced apart in the direction in which said support is propelled by said vehicle, a pivot member carried by said yoke parts and extending substantially parallel to the direction of travel of said support, a motor having an upright axis of rotation, a cultivator head depending from and driven by said motor, a bracket carried by said motor and connected to said pivot member to pivot said motor eccentrically of its axis, a pair of set screws carried by said support respectively above and below the pivot axis of said bracket, and a coil spring interposed between the end of each set screw and said bracket.

References Cited in the file of this patent

UNITED STATES PATENTS

| | | |
|---|---|---|
| 1,307,672 | Johnson | June 24, 1919 |
| 1,959,942 | Avignon | May 22, 1934 |
| 2,027,910 | Herring | Jan. 14, 1936 |
| 2,410,273 | Deubner | Oct. 29, 1946 |
| 2,442,198 | Dawley | May 25, 1948 |
| 2,489,633 | Fulgham | Nov. 29, 1949 |
| 2,521,549 | Smith | Sept. 5, 1950 |
| 2,539,174 | Baideme et al. | Jan. 23, 1951 |
| 2,610,559 | Peel | Sept. 16, 1952 |

FOREIGN PATENTS

| | | |
|---|---|---|
| 605,940 | Great Britain | Aug. 4, 1948 |